A. F. GALL.
KINETOSCOPE.
APPLICATION FILED OCT. 12, 1911.
1,204,424.
Patented Nov. 14, 1916.
5 SHEETS—SHEET 1.
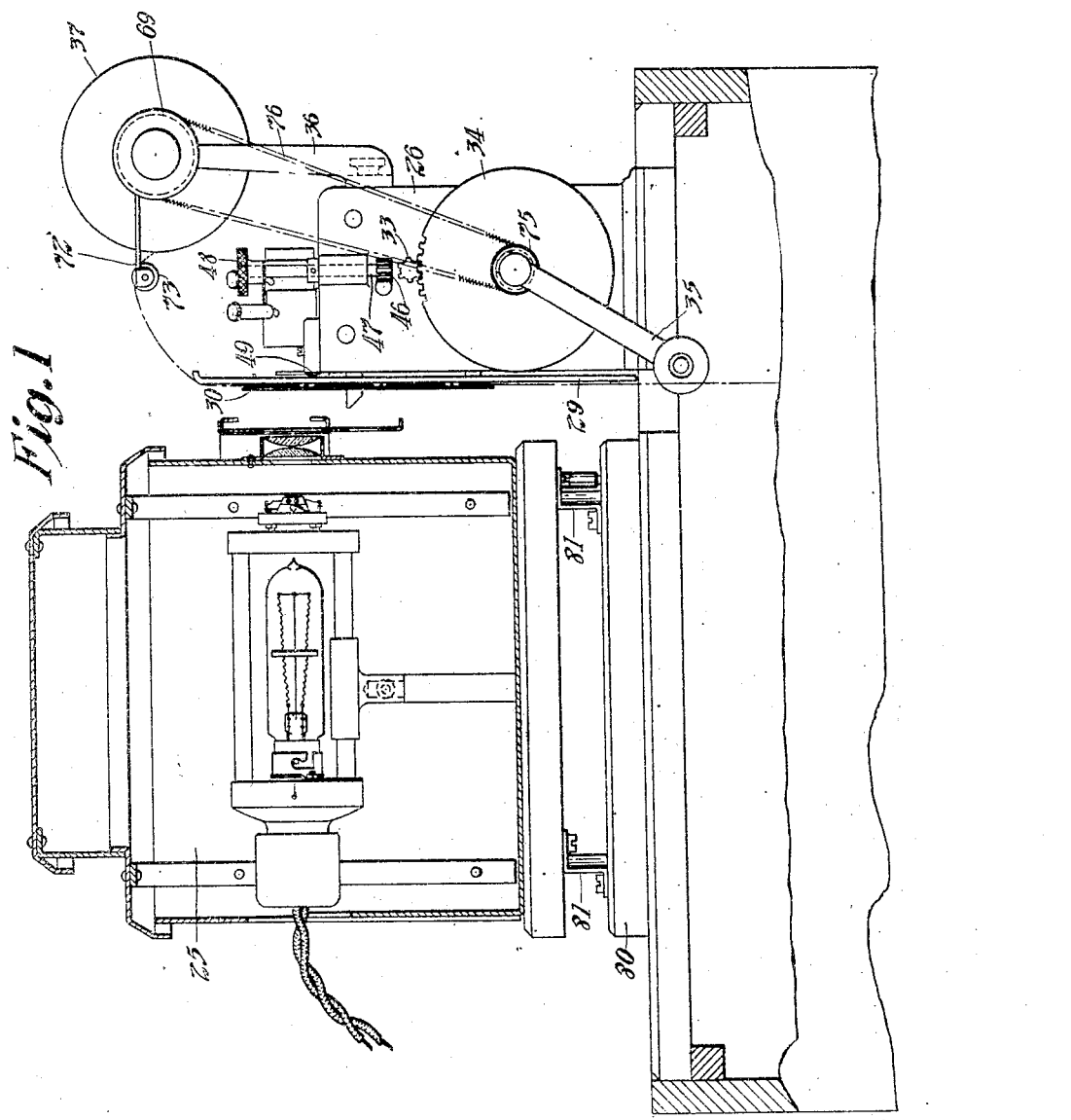
Witnesses:
Inventor:
Adolph F. Gall
by Frank L. Dyer
His Atty.

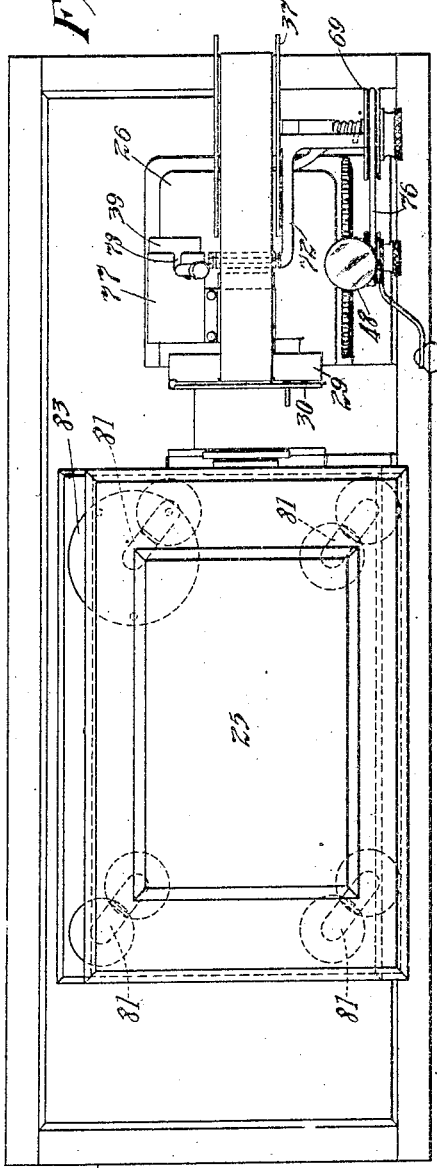
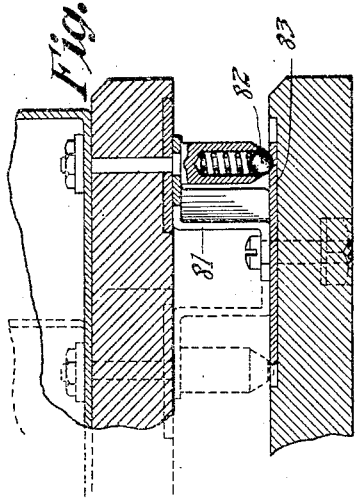
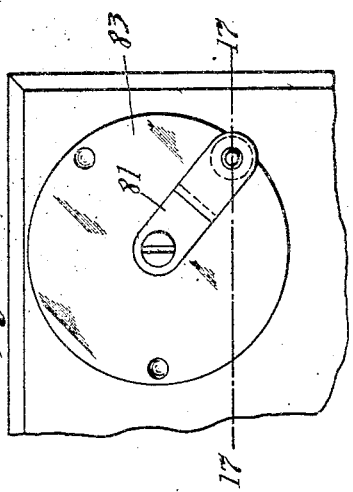

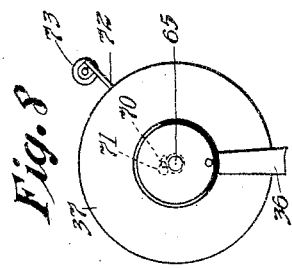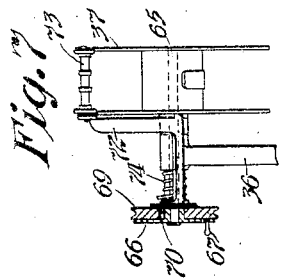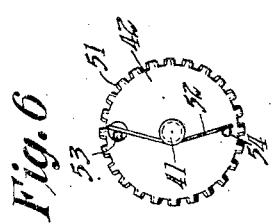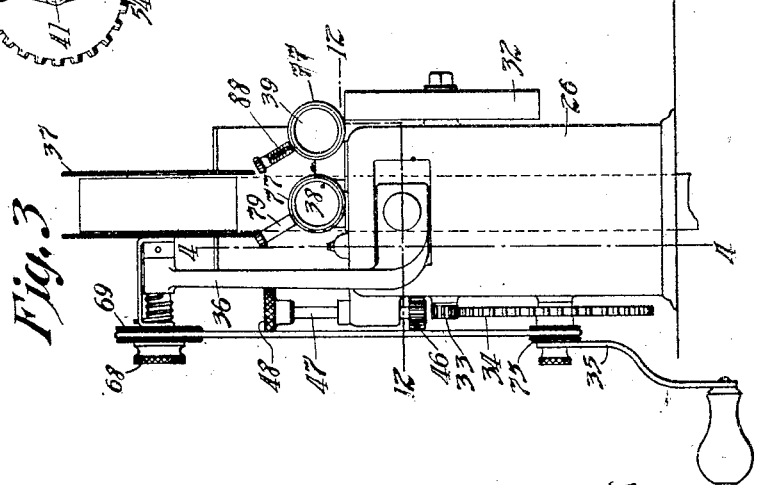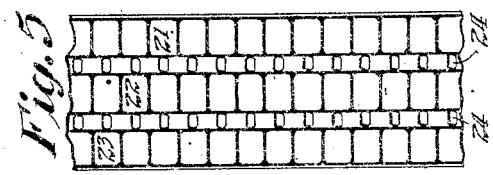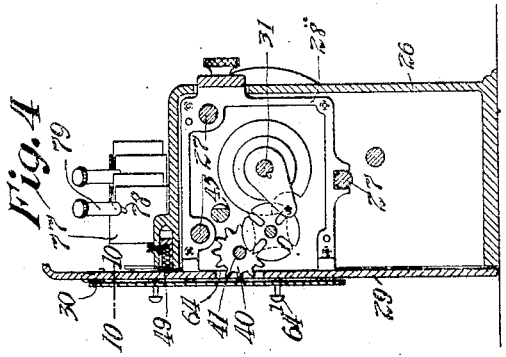

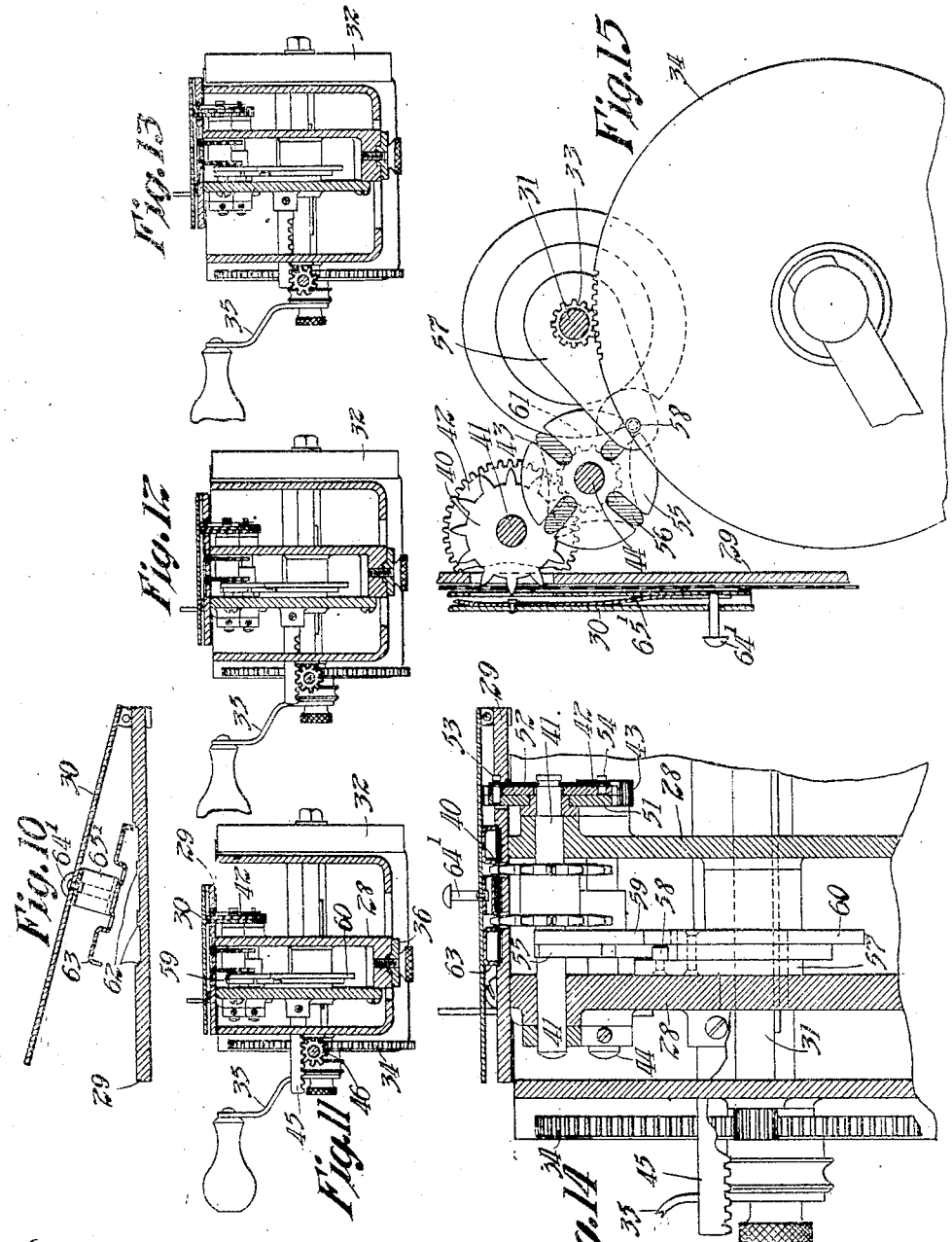

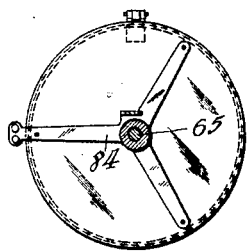
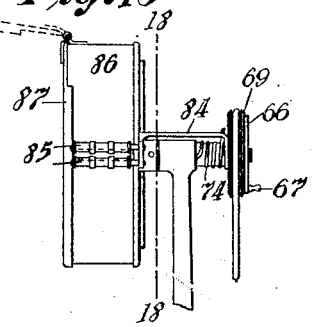
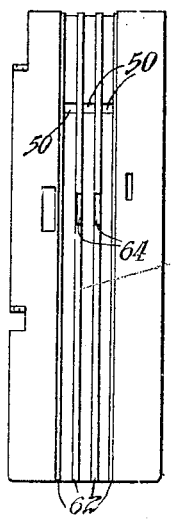
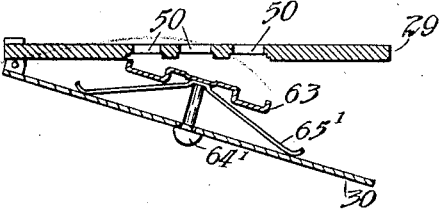
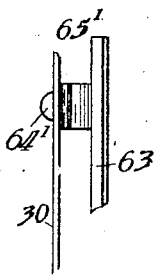

UNITED STATES PATENT OFFICE.

ADOLPH F. GALL, OF WEST ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

KINETOSCOPE.

1,204,424.

Specification of Letters Patent. Patented Nov. 14, 1916.

Application filed October 12, 1911. Serial No. 654,223.

*To all whom it may concern:*

Be it known that I, ADOLPH F. GALL, a citizen of the United States, residing at West Orange, in the county of Essex, State of New Jersey, have invented certain new and useful Improvements in Kinetoscopes; and I do declare the following to be a full, true, and exact description of the said invention, such as will enable others skilled in the art to which it appertains to make use of the same.

This invention relates to a very simple and efficient form of kinetoscope, and particularly one in which a film having a plurality of rows of pictures thereon can be used, and it is one of the objects of my invention to provide a mechanism by which such a film can be readily and easily controlled so as to project the different rows of pictures.

Another object of my invention is to provide a mechanism by which the film can be run in either direction through the machine without requiring any adjustment on the part of the operator.

Another object of my invention is to provide a simplified and compact arrangement of the mechanism so that it may be used successfully by unskilled persons and so as to cheapen its production without materially decreasing its efficiency.

With these and other objects in view, the invention consists of certain novel features of construction, combination, and arrangement of parts as will be more fully described and pointed out in the appended claims.

In the drawings, Figure 1 is a side elevation of the complete machine with a portion of the lamp house broken away. Fig. 2 is a plan view of the complete machine. Fig. 3 is a front elevation of the complete machine. Fig. 4 is a section of the operating mechanism on the line 4—4 of Fig. 3. Fig. 5 represents a portion of the film which the machine illustrated in the drawings is intended to use. Fig. 6 is a detail of the operative mechanism to be more fully described hereafter. Figs. 7 and 8 are two views of the film reeling device with the pulley and clutch shown in section. Fig. 9 is an elevation of the exposure plate with the film gate removed. Fig. 10 is an enlarged section of the exposure plate, showing the film gate opened, such section being taken on the line 10—10 of Fig. 4. Figs. 11, 12, and 13 show sections of the operating mechanism taken on the line 12—12 of Fig. 3, Fig. 11 showing the position of the mechanism when projecting one of the outside rows of photographs, Fig. 12, the central row and Fig. 13, the other outside row. Fig. 14 is an enlarged portion of Fig. 11. Fig. 15 shows a more or less diagrammatic view of the intermittent mechanism for moving the film, together with a portion of the exposure plate and the film gate. Fig. 16 is an enlarged plan view of one of the links for supporting the lamp house and the detent therefor. Fig. 17 shows a section taken on the line 17—17 of Fig. 16. Figs. 18 and 19 represent a modification of the film take up mechanism, with a film magazine, Fig. 18 being a section on line 18—18 of Fig. 19. Figs. 20 and 21 represent a modification of the pressure plate spring arrangement; Fig. 20 representing a section through the exposure openings of the aperture plate and Fig. 21 a side elevation of a portion of the plate and spring.

Corresponding parts are referred to both in the drawings and the following description by similar reference characters.

In the accompanying drawings, Fig. 5 illustrates the film which the machine used for purposes of illustration is intended to handle. This film carries three rows of photographs, the successive photographs representing successive positions of the object in motion as is done in the ordinary motion picture film. Each row of photographs may represent a different scene, or all the rows may be made to represent one continuous scene, so that after the row on one side of the film is projected, the central row will be made to follow immediately after, then the other outside row, thereby enabling me to represent a scene whose duration is three times as long as if the film carried only one row of photographs. In addition to the rows of photographs which I have indicated by 21, 22 and 23, the film also has two rows of equidistant perforations 24, into which portions of the mechanism engage to move the film. While I have specifically shown this particular form of film having three rows of photographs and the mechanism adapted to use it, it is obvious that the mechanism can be designed to use film having two, four, or more rows of photographs without departing from my invention, and that many of the features of my invention are useful with a film having only one row of pictures and it is also obvious that a single row of perforations might be used, although I find it is preferable to use a double row.

Referring now to the drawings, 25 represents generally the lamp house which is of the ordinary structure. I have illustrated as a source of illumination, the well-known Nernst lamp, though it is obvious that any other efficient form of illumination may be substituted for the Nernst lamp. The lamp house is provided with condensing lenses of a well-known type.

The operating mechanism for supporting and moving the film is located in front of the lamp house. A box-like frame 26 is provided as the main support for the operating mechanism. Projecting through this box-like frame are guide rods 27 on which is mounted an auxiliary frame 28 containing the operating mechanism for moving the film. To one side of this auxiliary frame 28 is fastened an exposure plate 29 to which is attached the film gate 30. A driving shaft 31 is mounted on bearings in the main frame 26 and has, on one end, a fly wheel 32 and on the other end, a pinion 33 meshing with a gear wheel 34 to which is attached a handle 35. To the auxiliary frame 28 is attached a bracket or support 36 in which is journaled a film reel 37. On the main frame 26 is mounted a projecting lens 38 for the motion pictures and the sterioptican lens 39 for lantern slides, which may be placed in front of the condensing lenses shown in section on the lamp house in Fig. 1.

The operating mechanism to intermittently move the film consists of a toothed sprocket drum 40 mounted on the shaft 41 journaled in the auxiliary frame 28. On the end of the shaft 41 is attached a gear 51 of peculiar structure to be more fully described hereafter, and meshing with the gear 51 is a pinion 43 on the end of the shaft 44 journaled in the auxiliary frame 28 and carrying one portion of a mutilated gear to be more fully described hereafter. Splined to the driving shaft 31 is the other portion of the mutilated gear meshing with the mutilated gear on shaft 44. Attached to the auxiliary frame 28 is a rack 45 meshing with a pinion 46 on the end of a vertical shaft 47 journaled in the casting 26 and provided with a knurled head 48. The main frame 26 is also provided with a bracket into which is placed a spring-seated ball detent 49, which engages with depressions in the plate 29 in the ordinary manner to hold the plate yieldingly in predetermined position. The plate 29 has a series of exposure openings 50, one opposite each row of photographs on the film used in the machine.

From the foregoing description, it will be seen that, by turning the knurled head 48, the auxiliary frame 28, with the operating mechanism for the film, will be moved along the guide rods 27 and the driving shaft 31, carrying with it the film reel support 36 and the film reel 37, so as to bring each row of photographs opposite the axis of the motion picture projecting lens 38, the detent 49 falling into a depression in the plate 29 when each row of film is central with such axis. If we assume that the plurality of rows of photographs represent a continuous scene, the auxiliary frame will be shifted to bring the outside row of photographs opposite the lens with the film wound up on the reel 37. By turning the handle 35, the outside row is passed across the lens until the end of the film is reached, with the end of the film still attached to the reel 37. The auxiliary frame will now be shifted to bring the central row of photographs on the film opposite the lens 38 and the handle 35 turned in the opposite direction to pass the central row across the lens and wind it up on the reel 37. When the last photograph of that row reaches the exposure opening, the auxiliary frame will again be shifted to bring the last row opposite the lens and the handle will be turned to again unreel the film.

In the process just described, it will be seen that the mechanism for moving the film is at one time moving in one direction, and another time in the opposite direction. If there is any back lash between the pinion 43 and the gear 51, the position of the photographs with relation to the exposure openings 50 will be shifted in accordance with the amount of such back lash, and since in my simplified mechanism I have provided no framing device, it is necessary to overcome this objection. I do this by attaching to the gear 51 a duplicate section 42 cut with precisely the same number of teeth and the same pitch, and mounting it rotatably on the gear 51. A spring 52 presses against pins 53 and 54, attached respectively to sections 51 and 42, tending to hold the two sections in such relative position as to make the width of the teeth on the gear as a whole wider than the teeth of either of the sections, the spring 52 engaging with a groove in shaft 41 to hold the section 42 against longitudinal movement. With this structure, if the spaces in the pinion 43 should be wider than the teeth on the gear 51, the spring 52 moves the section 42 to take up this extra space. It will be seen, therefore, that the teeth on the drum 40 are compelled to occupy a constant relation to the pinion 43 on shaft 44, no matter whether the handle 35 is being turned in one direction or the other, and that the photographs will be brought correctly to the exposure openings 50, no matter in which direction the film is being moved.

The mutilated gear for giving an intermittent motion to the drum 40 is in general of the well-known Geneva movement type but with improvements over the ordinary forms thereof. As illustrated, I have provided on shaft 44, a disk 55 with radial slots 56 therein. On the shaft 31 and splined thereto, as shown in Figs. 4 and 14, is an arm 57 carrying a pin 58 which, when the shaft 31 is turned, engages in the slots 56 to give shaft 44 an intermittent motion. Also attached to shaft 44 is a disk 59 located in alinement with the disk 60, splined to the shaft 31. The disk 59 has four concaved sides curved to fit the periphery of the disk 60, and the latter has a portion thereof cut away to permit the points of the disk 59 to pass when the shaft 44 turns. The disks 59 and 60 serve as a lock for the shaft 44.

The structure as described, is an improvement over the ordinary type of Geneva movement in that the locking disk 59 is separate and distinct from the radially slotted disk 55, so as to simplify the manufacture and cheapen the cost of production, and at the same time, to give a structure in which the radially slotted disk may have its full strength, and at the same time provide sufficient locking surface between the disks 59 and 60. With the ordinary structure, the disk 55 serves to carry both the slots and the concaved sides, and if thus designed, would necessarily be cut away on the dotted line which I have indicated by 61, or else the disk 60 would be made smaller, thus reducing its wearing surface, which would be limited to the arc between the radial slots on the disk 55.

The exposure plate 29 is provided with vertical guide ways 62 to support the film at its outer edges and between each row of photographs, and at the same time to keep the photographic surfaces from rubbing against the plate 29. Hinged to the plate 29 is a film gate 30 which carries a tension plate 63 mounted on pins 64' and held yieldingly away from the gate 30 by flat springs 65'. The pins 64' fit loosely in the gate 30, so that the plate 63 can be rocked laterally and longitudinally with relation to the plate 30. This enables the plate 63 to conform to any unevenness in the film. The spring tension device for the plate 63 may consist either of a single spring, as shown in Figs. 10 and 15, running lengthwise of the plate 63, or of a pair of springs running crosswise of the plate 63 and one at the top and one at the bottom thereof, as shown in Figs. 20 and 21. I prefer the latter arrangement because of the increased flexibility in positioning the plate 63 when in contact with plate 29, due to the fact that the springs do not prevent a rocking motion of the plate in either direction, as the arrangement of Fig. 10 is liable to do. Coiled springs surrounding pins 64' may be used instead of the flat springs shown in Fig. 20. The plate 63 is also provided with projecting strips and grooves, so that when the gate 30 is closed and the tension plate 63 is pressed against the exposure plate 29, the projections on the tension plate 63 coöperate with the guide ways 62 to hold the film flat without touching any of its photographic surfaces. Plate 29 is also provided with openings 64 through which project the teeth on the drum 40 and engage the film when held in the guide way formed by the plates 63 and 29.

I have provided a film take-up device of a novel design and one which, while particularly useful in connection with the mechanism which I have illustrated, is obviously not limited to use with such a structure. The film reel 37 is mounted upon and attached to one end of a shaft 65, journaled in the bracket 36. On the opposite end, shaft 65 has a member 66 that is provided with a handle 67 in the form shown in Fig. 7, or with a knurled head, in the form shown in Fig. 3. Loosely mounted on this member 66 is a pulley 69, provided with a roller clutch 70 of a well-known type, so that when the pulley 69 is moved in one direction, the cam surface 71 unlocks the roller 70 and permits the pulley to be turned freely, without affecting the member 66 and the shaft 65. When the pulley is turned in the opposite direction, however, the cam surface 71 moves over the roller 70 to jam the latter between the pulley 69 and the member 66 to drive the latter positively.

Pivoted on the hub of the bearing of the shaft 65 is a swinging arm 72 carrying a roller 73, over which the film from the roller 37 passes to the exposure plate 29. Around the hub of the bearing for the shaft 65 is a coiled spring 74, one end of which is fastened to the arm 36 and the other of which bears against the swinging arm 72 to produce a tension on the film. At the same time, the coiled spring, having been compressed slightly before being placed in position, moves the shaft 65 longitudinally and thus presses the film reel 37 against the hub of the stationary arm 36, producing the slight retarding friction necessary to prevent the film being unreeled too rapidly. Attached to the handle 35 is a pulley 75, and connecting the pulleys 75 and 69 is a spring belt 76.

From the description, it will be seen that, when the handle 35 is turned so as to cause the drum 40 to draw the film downward, the belt 76 will be moved in such a direction as to cause the pulley 69 to free itself from the shaft 65, thus permitting the film to be drawn freely from the reel 37. Since the motion of the drum 40 is intermittent, it is desirable to provide the tension roller 73 to equalize the strains on the film, and to tend to cause the reel 37 to turn at a uniform rate. The effect produced by the spring 74 on the reel 37, prevents the latter from feeding off the film faster than it can be taken by the drum 40. While I have shown the roller 73 as mounted on the arm 72 pivoted concentrically with shaft 65, it will be understood that this simply illustrates my preferred form. It is obvious that any yieldingly mounted spring roller between the film reel and the intermittent drum will have the same effect in relieving the film on the reel from the sudden jerks given to it by the intermittent drum.

After all of the film is drawn from the reel 37, the knurled head 48 will be turned to bring the central row of photographs opposite the projecting lenses, and the motion of the handle 35 will then be reversed so that the film will pass upwardly between the plates 29 and 30. The spring belt 76 will now rotate the pulley 69 is such a direction as to cause the clutch 70 to operate and to turn the shaft 65 and the reel 37 and wind up the film. The spring belt 76 provides a yielding device so as to prevent any undue pressure on the film by reason of its being wound up too fast. When the film moves in this direction, the roller 73 acts to equalize the pressure on the film due to any difference in the rates at which it passes the drum 40, and is taken up on the reel 37. In other words, if for any reason the reel 37 does not take up the film temporarily as fast as it passes the drum 40, the arm 72 will swing upward and tend to take up the surplus film. If on the other hand, the reel 37 is tending to take up the film too fast, the arm 72 will be pulled downward, thus temporarily supplying a further quantity of film to the reel 37.

It is sometimes desirable to provide a protecting covering or fireproof magazine for the film on reel 37, and this I do by the structure illustrated in Figs. 18 and 19. Instead of the arm 72 in the form shown in Figs. 7 and 8, I use an arm 84 mounted in exactly the same manner as arm 72 and held by the same spring 74. Arm 84, however, has three branches and a can or magazine 86 is fastened to the three branches and thus is free to rotate around the shaft 65. One of the branches of arm 84 carries two rollers 85 which have the same function and method of operation as roller 73. The magazine 86 is provided with a slit in its side opposite the rollers 85, through which the film passes from the reel 37 inside the magazine, to the feeding mechanism.

87 is a swinging cover for the magazine 86, which is closed after the reel 37 is in place. In operation, the arm 84 swings around the shaft 65 precisely the same as does arm 72, as previously described, and since the magazine 86 moves with 84, the slot in the side thereof always occupies the same relation to the rollers 85 and the passage of the film from the magazine to the rollers 85 is not affected by the changing positions of the arm 84, as would be the case if the magazine were fixedly mounted.

The projecting lens 38 and the stereopticon lens 39 are each fitted in the usual cylindrical mount. I have provided a simple form of adjustment for focusing purposes for these lenses. I provide a tubular member 77 provided with a curved opening 78 in its wall, through which projects a handle or stem 88 attached to the lens mount. This stem is threaded and over it is placed a threaded sleeve 79, as shown in section in Fig. 3. By rotating the lens mount by means of the handle 79, the engagement of the stem 88 with the slot 78 causes the lens to be moved toward or away from the exposure opening 50 to focus the picture. After the lens is focused, it is clamped in position by turning the handle 79, which because of the screw thread on 88, binds the lens mount in the tubular member 77.

The lamp house 25 is mounted on the base 80 by four Z-shaped links 81, one of which has attached to it a spring-seated ball 82, coöperating with indentations in a plate 83 in the base 80 to hold the lamp house yieldingly in predetermined positions. It will be seen that when the lamp house is moved, it is forced to travel in a circle with the axis of the lamp house always parallel to its original position, and therefore always parallel to the axis of the projecting lens. As shown in Figs. 2 and 16, I have provided the circular member 83 with three depressions, so as to locate the lamp house properly either in operative alinement with the motion picture lens, or with the stereopticon lens, or to hold it farthest removed from these lenses and the exposure plate 29 so as to give free access to the mechanism when threading the film.

While I have illustrated and described my invention as a device using a reel of film, it may also be used efficiently with the film made up as a continuous band, in which case the bracket 36 and the belt 76 would be removed. When a continuous band of film is used, there will be no reversal of the motion of the mechanism, since shifting from one row of pictures to the other would occur upon the completion of one turn of the band.

Having now described my invention, what I claim as new and desire to secure by Letters Patent is as follows:

1. In a kinetoscope, a main frame, a lens mounted thereon, a plate movably mounted on said main frame and having a plurality of exposure openings therein and means for moving said plate at will and without operating the film feeding mechanism to bring any desired one of said openings opposite the axis of said lens, substantially as described.

2. In a kinetoscope, a main frame, a lens mounted thereon, a plate movably mounted on said main frame and having a plurality of exposure openings therein, means for moving said plate at will and without operating the film feeding mechanism to bring any desired one of said openings opposite the axis of said lens, and a detent adapted to hold said plate with the center of any such opening in the axis of said lens, substantially as described.

3. In a kinetoscope, a driving shaft adapted to be continuously rotated, a driven shaft parallel to said driving shaft, a disk fastened to said driven shaft and having radial slots therein, a member mounted on and rotating with said driving shaft, and having a projecting pin adapted to engage said slots to intermittently rotate said driven shaft, and means separate from said disk and member comprising a pair of coacting elements respectively mounted on said shafts, adapted to hold said driven shaft stationary whenever said pin is out of engagement with said slots, substantially as described.

4. In a kinetoscope, a driving shaft adapted to be continuously rotated, a driven shaft parallel to said driving shaft, a disk fastened to said driven shaft and having radial slots therein, a member mounted on and rotating with said driving shaft, and having a projecting pin adapted to engage said slots to intermittently rotate said driven shaft, a plate having a plurality of concave sides on said driven shaft and means fixed to said driving shaft and adapted to engage said concave sides to hold said driven shaft stationary whenever said pin is out of engagement with said slots, substantially as described.

5. In a kinetoscope, a driving shaft, a driven shaft parallel thereto, mutilated gears connecting said shafts, and adapted to give an intermittent rotation to said driven shaft when the said driving shaft is continuously rotated, and means, independent of and separate from said mutilated gears comprising a pair of coacting elements respectively mounted on said shafts, adapted and arranged to hold said driven shaft stationary whenever said mutilated gears are out of engagement, substantially as described.

6. In a kinetoscope, a driving shaft, a driven shaft parallel thereto, mutilated gears connecting said shafts, and adapted to give an intermittent rotation to said driven shaft when the said driving shaft is continuously rotated, a plate separate from said gears and having a plurality of concave surfaces, mounted on said driven shaft, and a circular member separate from said gears and fixed to said driving shaft, adapted to engage said concave surfaces to hold said driven shaft stationary whenever said mutilated gears are out of engagement, substantially as described.

7. In a kinetoscope, an intermittently rotating shaft and reversible means to move it intermittently, a toothed drum adapted to engage the film, a pinion on said shaft and a gear on said drum meshing therewith, said gear being composed of two concentric disks, and a spring adapted and arranged to yieldingly resist relative rotation of said disks, substantially as described.

8. In a kinetoscope, an intermittently rotating shaft and reversible means to move it intermittently, a toothed drum adapted to engage the film, a pinion on said shaft, a gear on said drum meshing with said pinion, and means to prevent back lash between said gear and pinion, substantially as described.

9. In a kinetoscope, a plate having an exposure opening, reversible mechanism including a film operating member, an intermittent movement and gearing connecting said member and movement for moving the film in either direction longitudinally past said exposure opening, and means for preventing back lash in said gearing to cause the photographs on said film to be properly positioned relatively to said exposure opening, regardless of the direction in which said film is moved, substantially as described.

10. In a kinetoscope, a main frame, including two side plates and guide rods between them, an auxiliary frame, having two side members and slidingly mounted on said guide rods, a sprocketed drum between and journaled in said side members, a driven shaft journaled in said side members, a driving shaft journaled in the side plates of said main frame, and gearing between said side members connecting said driven and driving shafts, one portion of said gearing being slidingly mounted on said driven shaft, substantially as described.

This specification signed and witnessed this 9th day of October, 1911.

ADOLPH F. GALL.

Witnesses:
HENRY LANAHAN,
ANNA R. KLEHM.